US007182115B2

(12) United States Patent
Sindermann et al.

(10) Patent No.: US 7,182,115 B2
(45) Date of Patent: Feb. 27, 2007

(54) BEVERAGE BOTTLING PLANT FOR FILLING BOTTLES WITH A LIQUID BEVERAGE FILLING MATERIAL HAVING A CONTAINER FILLING PLANT CONTAINER INFORMATION ADDING STATION, SUCH AS, A LABELING STATION, CONFIGURED TO ADD INFORMATION TO CONTAINERS, SUCH AS, BOTTLES AND CANS, AND MODULES FOR LABELING STATIONS AND A BOTTLING PLANT HAVING A MOBILE MODULE CARRIER

(75) Inventors: Siegmar Sindermann, Kamen (DE); Paul Kahlisch, Fröndenberg (DE); Klaus Friedrich Stock, Dortmund (DE)

(73) Assignee: KHS Maschinen- und Anlagenbau AG, Dortmund (DE)

( * ) Notice: Subject to any disclaimer, the term of this patent is extended or adjusted under 35 U.S.C. 154(b) by 0 days.

(21) Appl. No.: 10/883,591

(22) Filed: Jul. 1, 2004

(65) Prior Publication Data

US 2005/0034423 A1 Feb. 17, 2005

(30) Foreign Application Priority Data

Jul. 2, 2003 (DE) ................................ 103 29 670

(51) Int. Cl.
*B32B 37/00* (2006.01)

(52) U.S. Cl. ........................ 156/363; 156/384; 156/567

(58) Field of Classification Search ................ 156/566, 156/567, 351, 363, 384, 387, 540, 541, 542, 156/556

See application file for complete search history.

(56) References Cited

U.S. PATENT DOCUMENTS 3,522,134 A * 7/1970 Von Hofe et al. .......... 156/571

(Continued)

FOREIGN PATENT DOCUMENTS

DE 197 41 476 A1 3/1999

(Continued)

*Primary Examiner*—James Sells

(74) *Attorney, Agent, or Firm*—Nils H. Ljungman & Associates

(57) ABSTRACT

A beverage bottling plant for filling bottles with a liquid beverage filling material, a container filling plant container information adding station, such as, a labeling station, configured to add information to containers, such as, bottles and cans, and modules for labeling stations and a bottling plant having a mobile module carrier. The present application further relates to a module carrier for use on labeling machines that are constructed in a modular fashion, whereby the present application teaches that the module carrier is equipped with means that facilitate its mobility. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

17 Claims, 9 Drawing Sheets

U.S. PATENT DOCUMENTS

| | | | | |
|---|---|---|---|---|
| 4,806,197 | A * | 2/1989 | Harvey | 156/449 |
| 5,188,696 | A * | 2/1993 | Good, Jr. | 156/361 |
| 6,460,471 | B1 * | 10/2002 | Yang | 108/156 |
| 6,550,512 | B2 * | 4/2003 | Yang | 156/351 |
| 6,796,352 | B1 * | 9/2004 | Geurtsen et al. | 156/446 |
| 6,805,182 | B2 * | 10/2004 | Ballarotti | 156/556 |
| 6,887,333 | B1 * | 5/2005 | Kessler et al. | 156/230 |
| 2004/0099379 | A1 * | 5/2004 | Erich | 156/567 |

FOREIGN PATENT DOCUMENTS

| | | | |
|---|---|---|---|
| DE | 19741476 | A1 * | 3/1999 |
| DE | 103 06 671 | A1 | 8/2004 |

* cited by examiner

BEVERAGE BOTTLING PLANT FOR FILLING BOTTLES WITH A LIQUID BEVERAGE FILLING MATERIAL HAVING A CONTAINER FILLING PLANT CONTAINER INFORMATION ADDING STATION, SUCH AS, A LABELING STATION, CONFIGURED TO ADD INFORMATION TO CONTAINERS, SUCH AS, BOTTLES AND CANS, AND MODULES FOR LABELING STATIONS AND A BOTTLING PLANT HAVING A MOBILE MODULE CARRIER

BACKGROUND

1. Technical Field

The present application relates in one respect to a beverage bottling plant for filling bottles with a liquid beverage filling material, a container filling plant container information adding station, such as, a labeling station, configured to add information to containers, such as, bottles and cans, and modules for labeling stations and a bottling plant having a mobile module carrier. The present application further relates to a module carrier for use in bottle handling machines that are constructed in a modular manner.

2. Background Information

A beverage bottling plant for filling bottles with a liquid beverage filling material can possibly comprise a beverage filling machine with a plurality of beverage filling positions, each beverage filling position having a beverage filling device for filling bottles with liquid beverage filling material. The filling devices may have an apparatus being configured to introduce a predetermined volume of liquid beverage filling material into the interior of bottles to a substantially predetermined level of liquid beverage filling material, and the apparatus configured to introduce a predetermined flow of liquid beverage filling material comprising apparatus being configured to terminate the filling of beverage bottles upon liquid beverage filling material reaching said substantially predetermined level in bottles. There may also be provided a conveyer arrangement being configured and disposed to move bottles, for example, from an inspecting machine to the filling machine. Upon filling, a closing station closes filled bottles. There may further be provided a conveyer arrangement configured to transfer filled bottles from the filling machine to the closing station; as well as a loading station that is configured to load filled bottles into containers, for example, in a six-pack arrangement. There may also be provided a conveyor arrangement configured to transfer filled bottles from the closing station to the loading station.

In the packaging of wares of diverse sorts, such as, for example, beverages or items of food, it has been found highly advantageous to configure the containers in which such wares are offered as advantageously and appealingly as possible. Aside from configuration of the body of containers, also the container labeling, that is ever increasing in display, also plays an increasingly important role.

When at one labeling machine several different container types are to be labeled, as is now customarily always the case, or, respectively, several diverse label sets need to be processed, down times of not insignificant duration arise due to necessary refitting efforts. This is particularly the case in the event that containers need to be furnished with several labels at the front side and at the rear side.

In order so as to provide solutions to this problem, inter alia, in German Patent No. DE 199 53 255, in U.S. Pat. No. 4,362,594, and in German Patent No. DE 197 41 476, designs are presented that allow to exchange the labeling stations that are arranged at a labeling machine in full, so that the down times can be markedly reduced, because the required conversion work that is required to be performed at a labeling station can be accomplished at a separate work location and as such essentially parallel as to time, that is, without shut-down of the labeling machine.

German Patent No. DE 199 53 255, U.S. Pat. No. 4,362,594, and German Patent No. DE 197 41 476 are hereby incorporated by reference as if set forth in their entirety herein.

Although the above-cited designs in the field of labeling technology have achieved a considerable advance in the art, there is not satisfactorily achieved, by the above-cited designs, quick and economic adaptation of labeling machines to labeling requirements that significantly deviate from one another.

Thus, customarily, often the task arises, for example, to precisely align containers having an embossed logo, or cliplock bottles, prior to labeling. In this it is state of the art that functional units that perform this task are fixedly and permanently arranged at the labeling machine, which substantially permanently reduces the number of possibly labeling stations, such that one has also not available these labeling stations in the case of processing containers that need not be aligned.

Similar considerations apply with functional units that control, for example, the presence or the correct position of labels. Again, these functional units, in accordance with the state of the art, are fixedly and permanently arranged at the labeling machines, such that the disadvantages enumerated above are also applicable in these situations.

During the handling, e.g. labeling, of containers such as bottles or cans with a wide variety of labels, different aggregates are necessary, depending on the label.

For example, the paper labels which are frequently used require at least a label magazine, a glue roller, glue segments, a glue segment carousel and a gripper cylinder. On the other hand, self-adhesive labels require a label strip dispenser, for example, as well as a cutting mechanism and a transfer device.

For example, DE 197 41 476 describes the realization of labeling machines in a modular fashion. The aggregates that are necessary for the labeling are combined into a separate unit or into a module and are interchangeably installed as such on the labeling machine.

When the container packaging or labeling is changed, for example when the labels used are changed or when the number of labels to be applied to the container is changed, the entire module can be replaced with only a few manual interventions, which results in a significant reduction of the times the bottling line is required to be out of operation.

Additional advantages of this method include the fact that adjustments and/or maintenance activities on the aggregates of a module can be performed off line, for the most part, in other words without any interruption of the actual production process.

Another application by the same applicant under Case No. DE 103 06 671.3 goes even further. That application teaches that not only are the aggregates required for the actual labeling of the containers combined into one module, but additional functions that may be required on a case-by-case basis and the components necessary for their realization can each be combined into a module. These functions can include, for example, an orientation function for containers that are not rotationally symmetrical or a control function for the result of the labeling, or a lettering function for the containers to be labeled (e.g. a "sell by" date).

The devices that are currently used, which combine the aggregates required for the labeling of containers into a single interchangeable module, have the disadvantage that these modules, in spite of their heavy weight of several hundred kilograms, do not have any means to facilitate the transport of these units.

This disadvantage is felt all the more severely if it is recalled that these modules generally have to be moved long distances from their storage location or from the staging area to the labeling machines, whereby these distances must also be traveled inside existing production equipment that is in continuous operation. Lifting devices and similar equipment are also necessary to install the modules in their operating positions.

It should also be noted that because of the high costs associated with production, the dimensions and surface areas of the space available in these plants are generally very small, which means that the use of fork-lift trucks, hoist trucks or similar industrial trucks is frequently possible only to a limited extent.

OBJECT OR OBJECTS

An object is to remedy and improve this situation so that the disadvantages described above can be eliminated.

SUMMARY

The objects can be accomplished in a module carrier for use on bottle handling machines such as labeling machines and similar installations, which is designed in a modular construction, characterized by the fact that the module carrier and/or the modules are held in a first "ready" position by the module carrier and in a second centered and/or working position can be attached to a bottle handling machine.

The objects can further be accomplished in a module carrier characterized by the fact that the module carrier, after it has been docked, can be moved out of its carried and supported position, and at the beginning of the undocking process can be returned to the carried and supported position.

The objects can further be accomplished in a module carrier characterized by the fact that the module carrier and/or the module is centered in at least a first level on the bottle handling machine and is centered on a second level by gravity.

The objects can further be accomplished in a module carrier characterized by the fact that the module carrier and/or the module is centered in a first upper level and/or plane, and in a second, lower level is automatically centered by gravity and/or by a freely adjustable stop.

The objects can further be accomplished in a module carrier for use on labeling machines that are realized in a modular construction, characterized by the fact that the module carrier is equipped with means that facilitate its mobility.

The objects can further be accomplished in a device characterized by the fact that said means are rollers or wheels.

The objects can further be accomplished in a device characterized by the fact that the module carrier contains a lifting device for the module, and for itself after the module is docked.

The objects can further be accomplished in a device characterized by the fact that the lifting device is at least one spindle hoisting mechanism or at least one scissor-jack mechanism or a hydraulic system.

The objects can further be accomplished in a device characterized by the fact that the module carrier is equipped with an energy storage device.

The objects can further be accomplished in a device characterized by the fact that the energy storage device is at least one storage battery for electrical energy.

The objects can further be accomplished in a device characterized by the fact that the rollers are driven by at least one motor.

The objects can further be accomplished in a device characterized by the fact that when the module carrier is engaged, it can be raised from the building floor at least party by its own lifting device.

The objects can further be accomplished in a device characterized by the fact that when the module carrier and/or the module are engaged, it or they can be lifted completely off the building floor.

The objects can further be accomplished in a device characterized by the fact that the module carrier and/or the module have at least one centering bushing or a similar device.

The objects can further be accomplished in a device characterized by the fact that the aggregates located on the base support contain means for the linear and/or rotational adjustment of their orientation in at least one of the three axes.

A module carrier can have a first a base support. Above this base support may be all the aggregates that may be necessary for the labeling and/or handling of the containers. These aggregates can vary in terms of type and/or quantity as a function of the type of label and/or the number of labels to be processed and/or the type of handling task.

Below the base support there can be a transport device. This transport device may have a base frame and a plurality of rollers fastened to the base frame. An electrical cabinet can also be disposed on the base frame, which electrical cabinet can hold all the electrical and/or electronic components required to control the aggregates located on the base support.

The connection between the base support and the transport device may be created by a lifting device. This lifting device can be a lifting spindle hoisting mechanism, for example. In additional configurations, this lifting spindle hoisting mechanism can be replaced by other lifting means that will be familiar to a technician skilled in the art. Those means can include, for example, a scissor-jack mechanism similar to a scissor-jack lifting platform of the prior art, or a structure that operates using hydraulic cylinders. Lifting means that are also known from the prior art but are not explicitly discussed here can also be provided.

With regard to the lifting device, the necessary drive energy can be provided either by an energy source that can be part of the module carrier, e.g. a storage battery for electrical energy, or that can be connected using a detachable plug-in connector, by the actual labeling machine or manually by the person operating the labeling machine.

In an additional development, for cases in which the module carrier may have its own energy source, the rollers can be motor-driven, which may have additional advantages for the handling and operation of a device of the type claimed by the present application.

The operation of a device as claimed by the present application is described in greater detail below.

In one possible embodiment, the transport device can be rolled manually into position by pushing a push handle. In another possible embodiment, the transport device may be rolled into position by its own energy source. The table may have a first stop element, which first stop element can be configured to come into contact with a first end face of the transport device when the transport device is being rolled into position. The first stop element can be configured to stop the transport device and essentially align the transport device in a working position with respect to the table.

Initially, the lifting device can be in a raised, activated first position, as a result of which the base support may be raised a certain distance above the upper edge of the machine table of the labeling machine. Then the entire module carrier can be positioned so that the centering socket that is permanently connected to the base support may be located essentially centered over the centering pin which can be connected with the machine table.

Once that is the case, the lifting device can be lowered, as a result of which the centering pin may be effectively engaged with the centering pin, i.e. it may assume a second centering and working position.

As the process continues, the lifting device can be moved further into an inactive position, as a result of which the rollers may be raised and finally may be no longer in contact with the floor of the building.

In another possible embodiment, once the transport device is rolled into position and the first stop element is in contact with the first end face, the centering socket can be disposed essentially centered over the centering pin of the machine table. At this point, the lifting device may be activated. The lifting device can be disposed on top of the base frame, and may be connected to a support bar structure, which support bar structure may be connected to the base support. On either side of the lifting device could be located two guide rods. The guide rods may be substantially perpendicular to the base frame. The lifting device can be activated to move or lower the support bar structure along the guide rods. The lifting device also may thus lower the base support, which base support can be connected to the support bar structure. The lifting device thus lowers the base support until the centering socket is engaged with the centering pin on the machine table.

After the base support has been lowered and the centering socket and centering pin are in engagement, the lifting device can continue to operate. As a result, the base frame can be moved toward the support bar structure and thus the wheels may be lifted off of the floor so that the transport device is suspended from the machine table. At the end of the base frame immediately adjacent the table may be located a second end face. When the base frame is moved by the lifting device, the second end face is brought into contact with a second stop element located on the table. The second stop element may be configured to stop the movement of the base frame. In other words, the base support and the base frame may be moved towards one another by the lifting device to clamp the transport device about the machine table, such as in the manner of a C-clamp. The transport device may thereby be held or clamped in a fixed position by the lifting device at the point where the centering socket is engaged with the centering pin, and at the point where the first and second end faces are in contact with the first and second stop elements. As a result, the entire transport device may be clamped to and suspended from the table.

In a further possible embodiment, the first end face on the support bar structure contacts the first stop element on the machine table to position the transport device relative to the machine table. During operation of the lifting device to move the support bar structure and the support frame, the first end face moves as well since it is part of or connected to the support bar structure. The first end face can be designed to be long enough such that as the support bar structure moves, the first end face is substantially continuously in contact with the first stop element to prevent the transport device from moving out of alignment with respect to the table.

Since the above described bottling and labeling machines may be working with liquids and breakable materials, it may be possible for spills to occur. Since the wheels of the transport device can be lifted off the ground, it may be possible to clean any spills from underneath the machine.

As a result of the process described above, the entire labeling and/or handling aggregate can be correctly positioned and oriented automatically by the geometry of the labeling machine or by the settings of the stop elements of the labeling machine, and may no longer need to be positioned with respect to whatever the configuration of the floor happens to be.

Once the rollers are no longer in contact with the floor of the building, the unit can be positioned and fixed in position exclusively by the active connection between the centering pin, the centering socket and the first and second stop elements.

In a further development, the aggregates that are located on the base support may include means that can make possible a linear and/or rotational adjustment of their orientation in at least one of the three axes. As a result of this method, when the container being labeled is changed, for example, it may be an easy matter to adjust the position of the label or the orientation of the label to the requirements of the new container.

Please note that any number of aggregates or modules, such as, for example, labeling modules, inspection modules, or alignment models, may be used in conjunction with the transport device, or may be disposed atop the base support in alternate embodiments. The transport device may therefor be used to transport any number of different aggregates or modules from one place to another.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is explained in greater detail below with references to exemplary embodiments that are illustrated in the accompanying drawings.

DESCRIPTION OF EMBODIMENT OR EMBODIMENTS

Developments, advantages and potential applications are presented in the following description with reference to the exemplary embodiments that are illustrated in the accompanying drawings. All the characteristics described and/or illustrated therein, individually and/or in any desired combination, thereby represent the object of the present application, regardless of their combination in the claims or the references between claims. The text of the claims is also incorporated by reference into the description.

Figure 1:
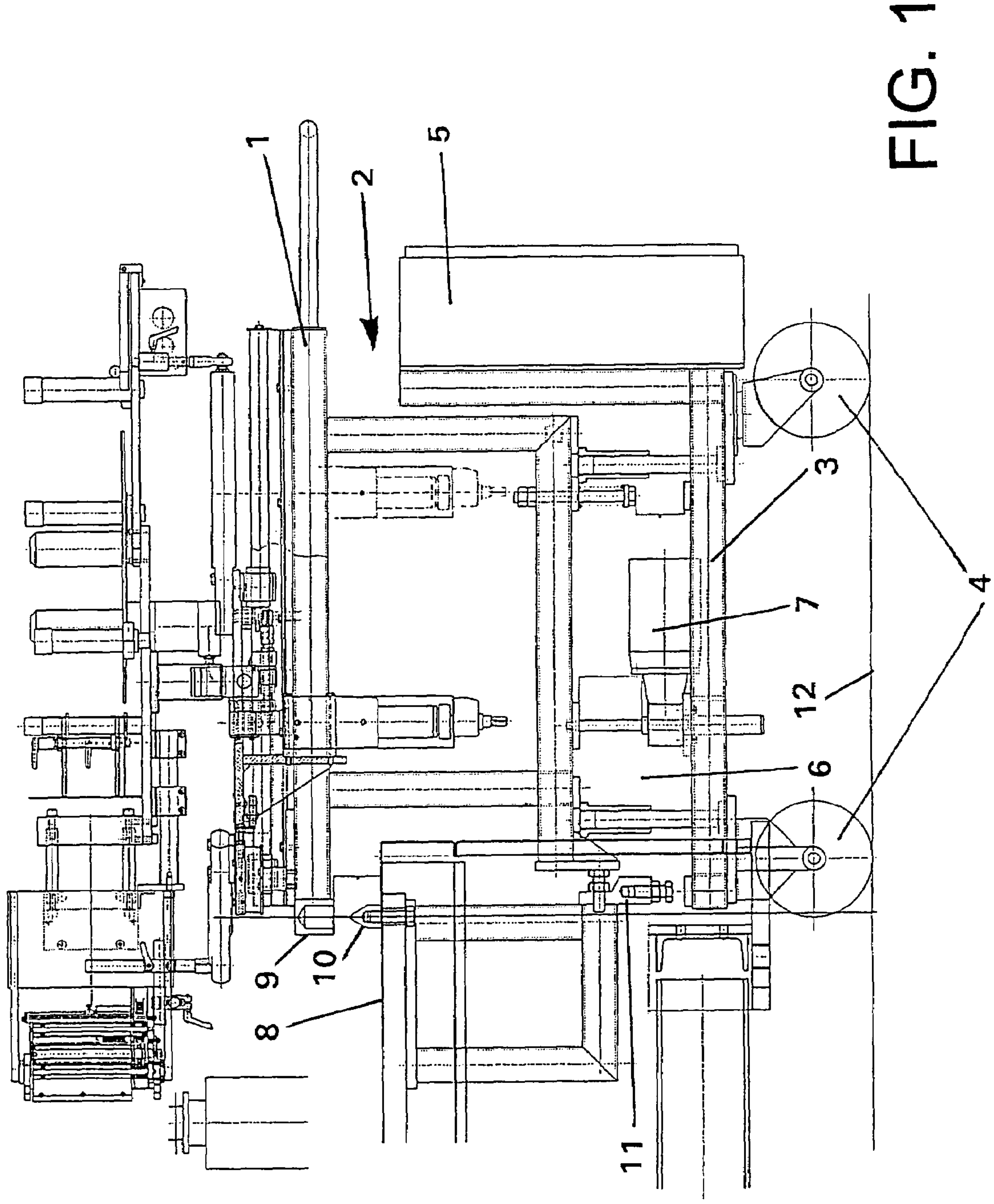
FIG. 1 is a side view of a module carrier in a first position in which it is not yet connected to the labeling machine.
Figure 1A:
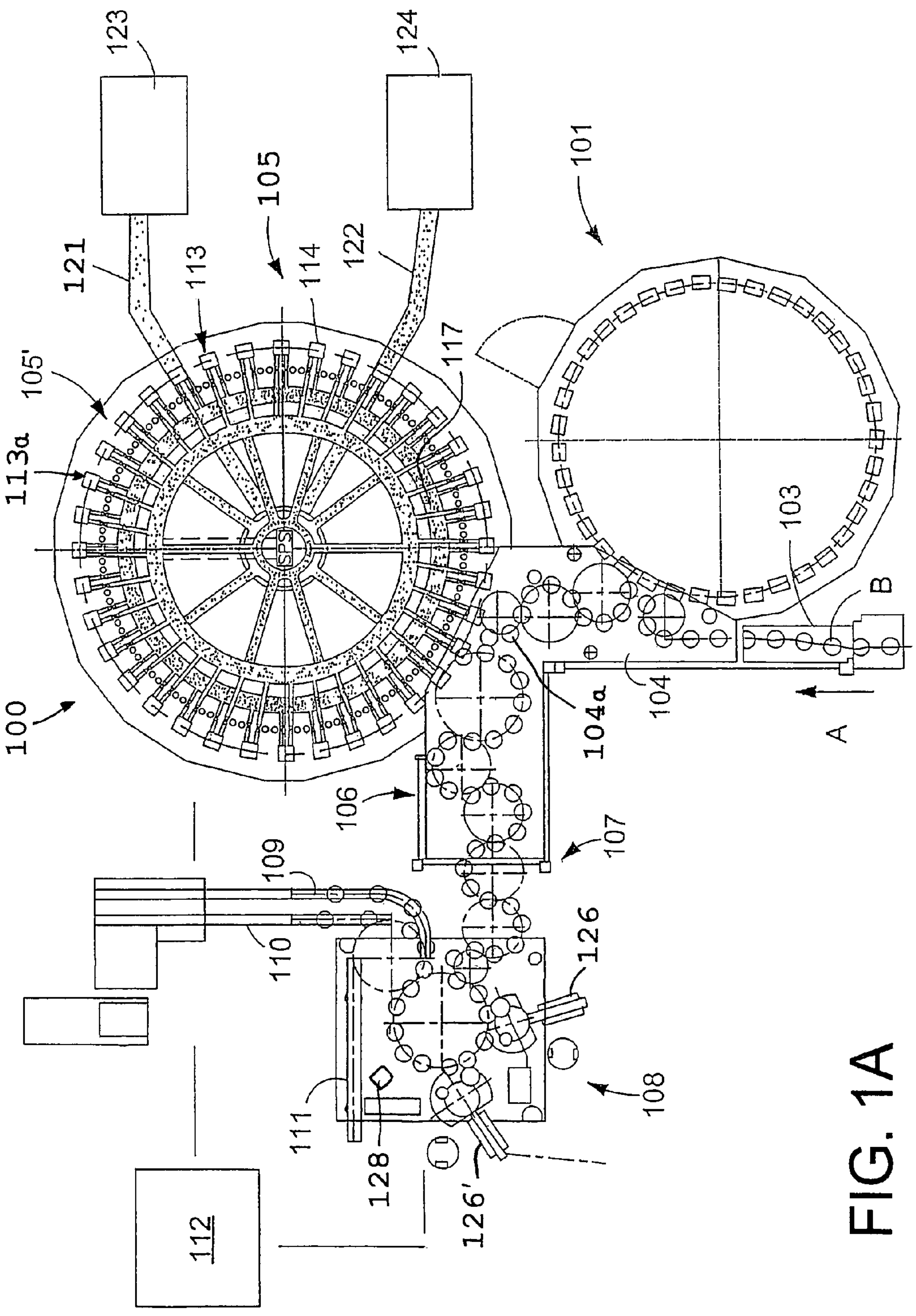
FIG. 1A is a schematic illustration of a container filling plant in accordance with one possible embodiment.

FIG. 1A shows schematically the main components of one embodiment example of a system for filling containers, specifically, an embodiment of a beverage bottling plant 100 for filling bottles B with liquid beverage filling material, in accordance with one embodiment, or in which system or plant could possibly be utilized at least one aspect, or several an aspects, of the embodiments disclosed herein.

FIG. 1A shows a rinser or rinser station 101, to which the containers, namely bottles B, are fed in the direction of travel as is indicated by the arrow A, by means of a conveyer line or conveyer arrangement 103, and downstream of rinser station 101, in the direction of travel as is indicated by the arrow A, the rinsed bottles B are transported to a beverage filling machine 105 by means of a conveyer line or conveyer arrangement 104 that is formed, for example, by a star wheel conveyer or a plurality of star wheels of a conveyer arrangement. The conveyer arrangement 104 may possibly comprise a star wheel 104*a* that introduces bottles B to the filling machine 105.

Downstream of the filling machine 105, in the direction of travel of the bottles B, there can preferably be a closer or closer station 106 which closes the bottles B.

The closer or closer station 106 can, for example, be connected directly to a labeling device or labeling station 108, such as, for example, by means of a conveyer line or conveyer arrangement 107 that may be formed, for example, by a plurality of star wheels of a conveyer arrangement.

In the illustrated embodiment, the labeling device or labeling machine or labeling station 108 has, for example, three outputs, namely one output formed by a conveyer or conveyer arrangement 109 for bottles B that are filled with a first product. The first product may possibly be provided by a product mixer 123 that is connected to the filling machine 105, for example, through a conduit 121, and bottles B that are filled with a predetermined volume of liquid beverage filling material, that is, the first product, are then labeled by a labeling module 126 in the labeling stations 108 corresponding to this first product delivered from product mixer 123 to the beverage filling machine 105 and thence to the corresponding bottles B. One embodiment of a labeling station, or labeling machine, is described in greater detail herein below with reference to FIG. 1.

A second output that is formed by a conveyer or conveyer arrangement 110 is provided for those bottles B that are filled with a second product. The second product may emanate from a second product mixer 124 that is connected, for example, through a conduit 122 to the filling machine 105, and these bottles B filled with a predetermined volume of liquid beverage filling material comprising the second product are then correspondingly labeled by a labeling module 126' in the labeling station 108 corresponding to this second product.

A third output, for example, formed by a conveyer or conveyer arrangement 111, removes any bottles B which have been incorrectly labeled as may have been determined by an inspecting device or an inspecting station, or an inspecting module 128 that may possibly form a part of the labeling station 108.

In FIG. 1A item 112 is a central control unit or, expressed differently, a controller or a system which includes a process controller that, among other things, controls the operation of the above-referenced system or plant.

The beverage filling machine 105 is preferably of the revolving design, with a rotor 105', which revolves around a vertical machine axis. On the periphery of the rotor 105' there are a number of filling positions 113, each of which comprises bottle carriers or container carriers 113*a* that are configured and disposed to present bottles B for filling, as well as a filling device or element or apparatus 114 located or configured to be located above the corresponding container carrier 113*a* and the corresponding bottle B presented by the carrier 113*a*. The filling device or apparatus 114 comprises an apparatus configured to introduce a predetermined volume of liquid beverage filling material into the interior of bottles B to a predetermined level of liquid beverage filling material. Furthermore, the filling device or apparatus comprises an apparatus configured to terminate the filling of bottles upon liquid beverage filling material reaching the predetermined level in bottles B. In other words, filling elements 114 are configured and disposed to provide a predetermined flow of liquid beverage filling material from the source thereof, such as, product mixers 123 and 124, into the bottles B.

The toroidal vessel 117 is a component, for example, of the revolving rotor 105'. The toroidal vessel 117 can be connected by means of a rotary coupling or a coupling that permits rotation, and by means of an external connecting line 121 to the external reservoir or product mixer 123 to supply the product, that is, product mix 1, for example.

As well as the more typical filling machines having one toroidal vessel, it is possible that in at least one possible embodiment a filling machine could possibly be utilized wherein each filling device 114 is preferably connected by means of two connections to a toroidal vessel 117 which contains a first product, say by means of a first connection, for example, 121, and to a second toroidal vessel which contains a second product, say by means of the second connection, for example, 122. In this case, each filling device 114 can also preferably have, at the connections, two individually-controllable fluid or control valves, so that in each bottle B which is delivered at the inlet of the filling machine 105 to a filling position 113, the first product or the second product can be filled by means of an appropriate control of the filling product or fluid valves.

It will be understood that while a two-product assembly or system of a bottling plant is illustrated in FIG. 1A, the disclosure is equally applicable to single-product installations, or other commensurate embodiments.

As shown in FIG. 1, a module carrier of the type claimed by the present application comprises first a base support 1. Above this base support 1 are all the aggregates that are necessary for the labeling and/or handling of the containers. These aggregates can vary in terms of type and/or quantity as a function of the type of label and/or the number of labels to be processed and/or the type of handling task.

Below the base support 1 there is a transport device 2. This transport device 2 comprises essentially a base frame 3 and a plurality of rollers 4 fastened to it. An electrical cabinet 5 can also be located on the base frame 3, which holds all the electrical and/or electronic components required to control the aggregates located on the base support 1.

The connection between the base support 1 and the transport device 2 is created by a lifting device 6. This lifting device 6 can be a lifting spindle hoisting mechanism 7 as illustrated in FIG. 1, for example. In additional configurations, this lifting spindle hoisting mechanism 7 can be replaced by other lifting means that will be familiar to a technician skilled in the art. Those means can include, for example, a scissor-jack mechanism similar to a scissor-jack lifting platform of the prior art, or a structure that operates using hydraulic cylinders. Lifting means that are also known from the prior art but are not explicitly discussed here can also be provided.

With regard to the lifting device 6, the necessary drive energy can be provided either by an energy source that is part of the module carrier, e.g. a storage battery for electrical energy, or that is connected using a detachable plug-in connector, by the actual labeling machine or manually by the person operating the labeling machine.

In an additional development, for cases in which the module carrier has its own energy source, the rollers 4 can be motor-driven, which has additional advantages for the handling and operation of a device of the type claimed by the present application.

The operation of a device according to one possible embodiment is described in greater detail below.

Figure 5:
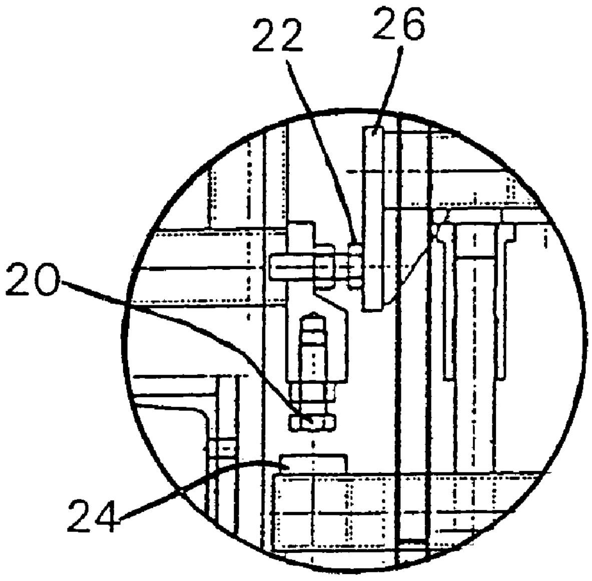
FIG. 5 is an exploded view of the stop elements and end faces in the raised first position.

In one possible embodiment, the transport device 2 is rolled manually into position by pushing the pushing handle 32 in the direction of travel 40. In another possible embodiment, the transport device 2 is rolled into position by its own energy source in the direction of travel 40. The label machine comprises a stop element 11, which stop element 11 is disposed to come into contact with the end face 26 of the transport device 2 when the transport device 2 is rolled into position in the direction of travel 40. The stop element 11 is configured to stop the transport device 2 and maintain the transport device 2 in the working position. FIG. 5 shows an exploded view of the first and second end faces and the first and second stop elements before the lifting device 6 has been activated.

Initially, the lifting device 6 is in a raised, activated first position, as a result of which the base support 1 is raised a certain distance above the upper edge of the machine table 8 of the labeling machine. Then the entire module carrier is positioned so that the centering socket 9 that is permanently connected to the base support 1 is located essentially centered over the centering pin which is connected with the machine table.

Once that is the case, the lifting device is lowered, as a result of which the centering pin is effectively engaged with the centering pin 10, i.e. it assumes a second centering and working position.

Figure 6:
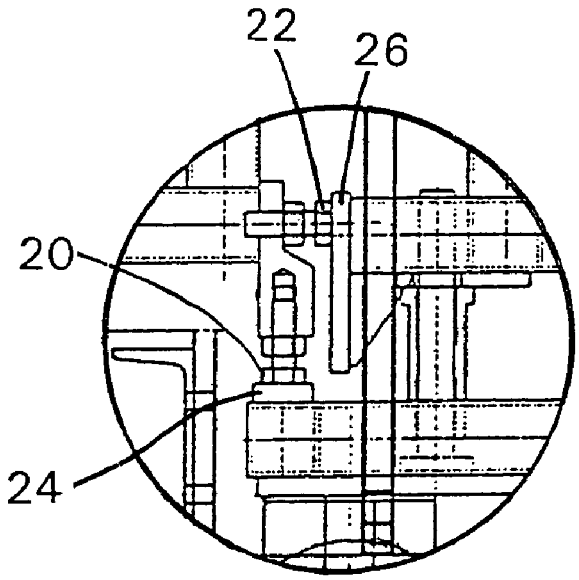
FIG. 6 is an exploded view of the stop elements and end faces in the engaged position.

In another possible embodiment, once the transport device 2 is rolled into position and the first stop element 22 is in contact with the first end face 26, the centering socket 9 is disposed essentially centered over the centering pin 10 of the machine table 8. At this point, the lifting device 6 is activated. The lifting device 6 is disposed on top of the base frame 3, and is connected to a support bar structure 30, which support bar structure 30 is connected to the base support 1. On either side of the lifting device 6 are located two guide rods 28. The guide rods 28 are substantially perpendicular to the base frame 3. The lifting device 6 is activated to move or lower the support bar structure 30 along the guide rods 28. The lifting device 6 also thus lowers the base support 1, which base support 1 is connected to the support bar structure 30. The lifting device 6 thus lowers the base support 1 until the centering socket 9 is engaged with the centering pin 10 on the machine table 8. FIG. 6 shows an exploded view of the first and second end faces 26 and 24 in an engaged position with the stop elements 22 and 20.

After the base support 1 has been lowered and the centering socket 9 and centering pin 10 are in engagement, the lifting device 6 continues to operate. As a result, the base frame 3 is moved toward the support bar structure 30 and thus the wheels 4 are lifted off of the floor so that the transport device 2 is suspended from the machine table 8. At the end of the base frame 3 immediately adjacent the table 8 is located a second end face 24. When the base frame 3 is moved by the lifting device 6, the second end face 24 is brought into contact with a second stop element 20 located on the table 8. The second stop element 20 is configured to stop the movement of the base frame 3. In other words, the base support 1 and the base frame 3 are moved towards one another by the lifting device 6 to clamp the transport device 2 about the machine table 8, such as in the manner of a C-clamp. The transport device 2 is thereby held or clamped in a fixed position by the lifting device 6 at the point where the centering socket 9 is engaged with the centering pin 10, and at the point where the first and second end faces 26 and 24 are in contact with the first and second stop elements 22 and 20. This fixed position is illustrated in FIG. 6. As a result, the entire transport device 2 is clamped to and suspended from the table 8.

In a further possible embodiment, the first end face 26 on the support bar structure 30 contacts the first stop element 22 on the machine table 8 to position the transport device 2 relative to the machine table 8. During operation of the lifting device 6 to move the support bar structure 30 and the base frame 3, the first end face 26 moves as well since it is part of or connected to the support bar structure 30. The first end face 26 is designed to be long enough such that as the support bar structure 30 moves, the first end face 26 is substantially continuously in contact with the first stop element 22 to prevent the transport device 2 from moving out of alignment with respect to the table 8.

As a result of the process described above, the entire labeling and/or handling aggregate can be correctly positioned and oriented automatically by the geometry of the labeling machine or by the settings of the stop elements 11 of the labeling machine, and no longer needs to be positioned with respect to whatever the configuration of the floor happens to be.

Figure 2:
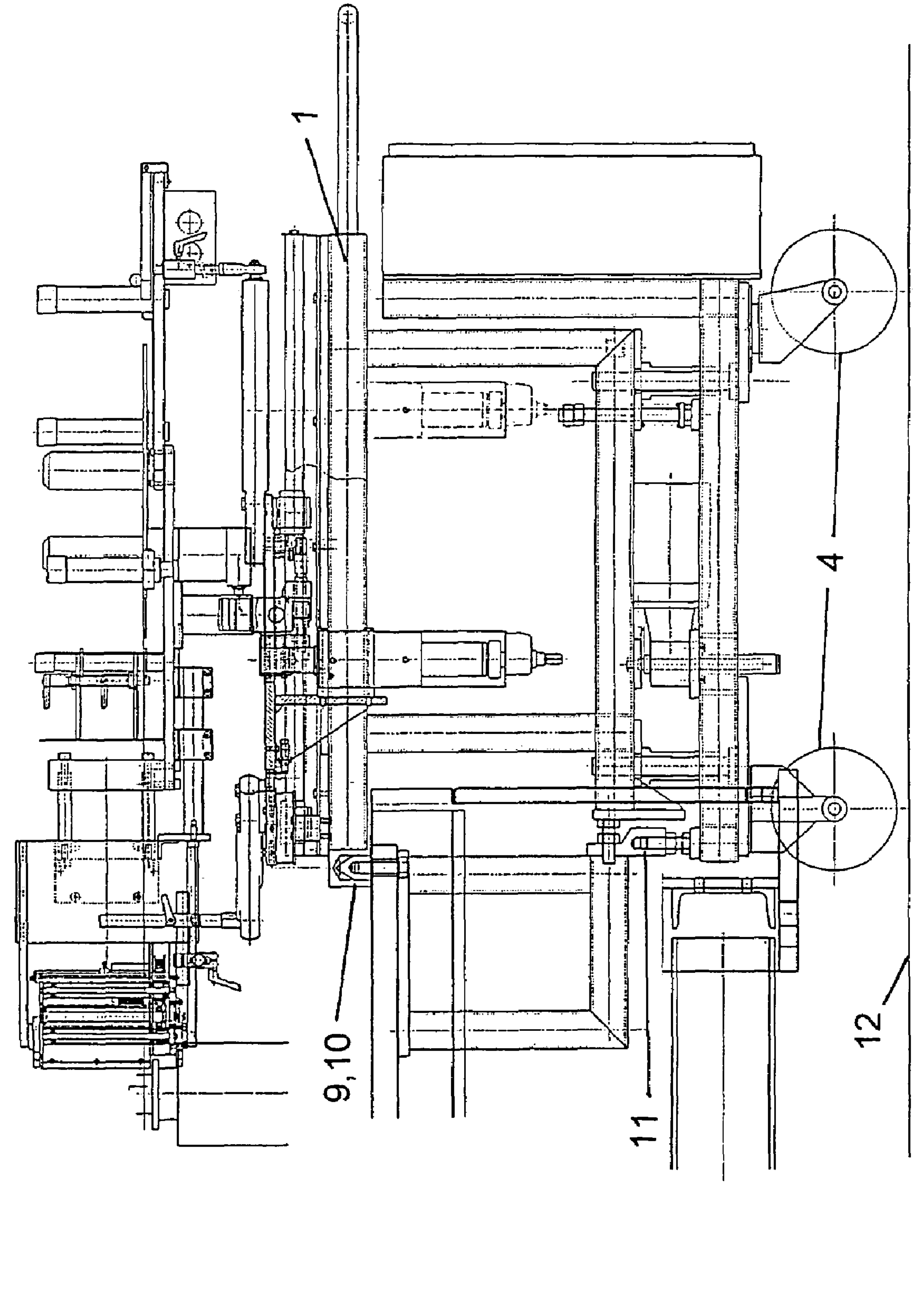
FIG. 2 is a side view of a module carrier of the type illustrated in FIG. 1 in a second position in which it is connected with the labeling machine.
Figure 3:
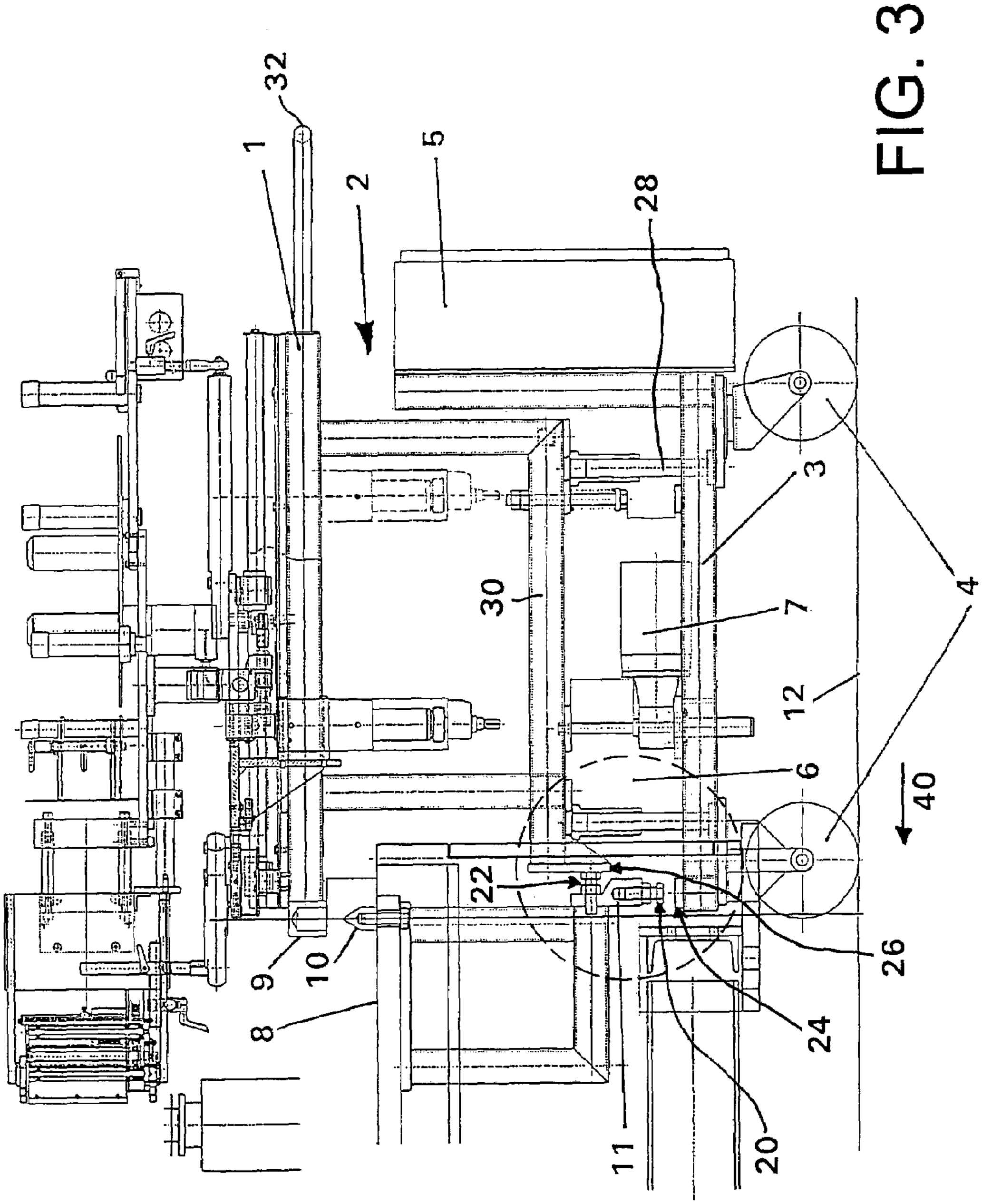
FIG. 3 is a side view of a module carrier according to one possible embodiment in a first position in which it is not yet connected to the labeling machine.
Figure 4:
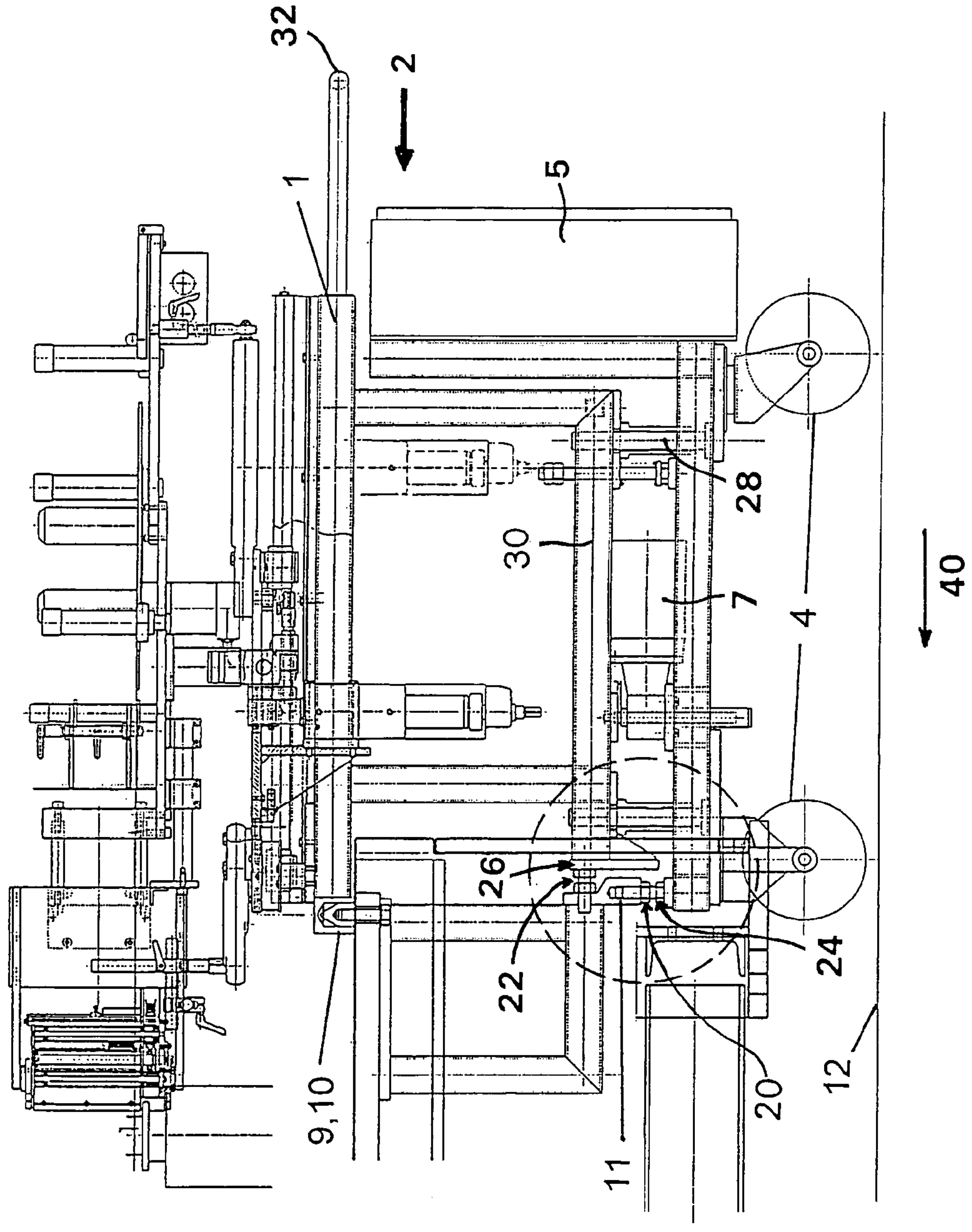
FIG. 4 is a side view of a module carrier of the type illustrated in FIG. 3 in a second position in which it is connected with the labeling machine.
Figure 7:
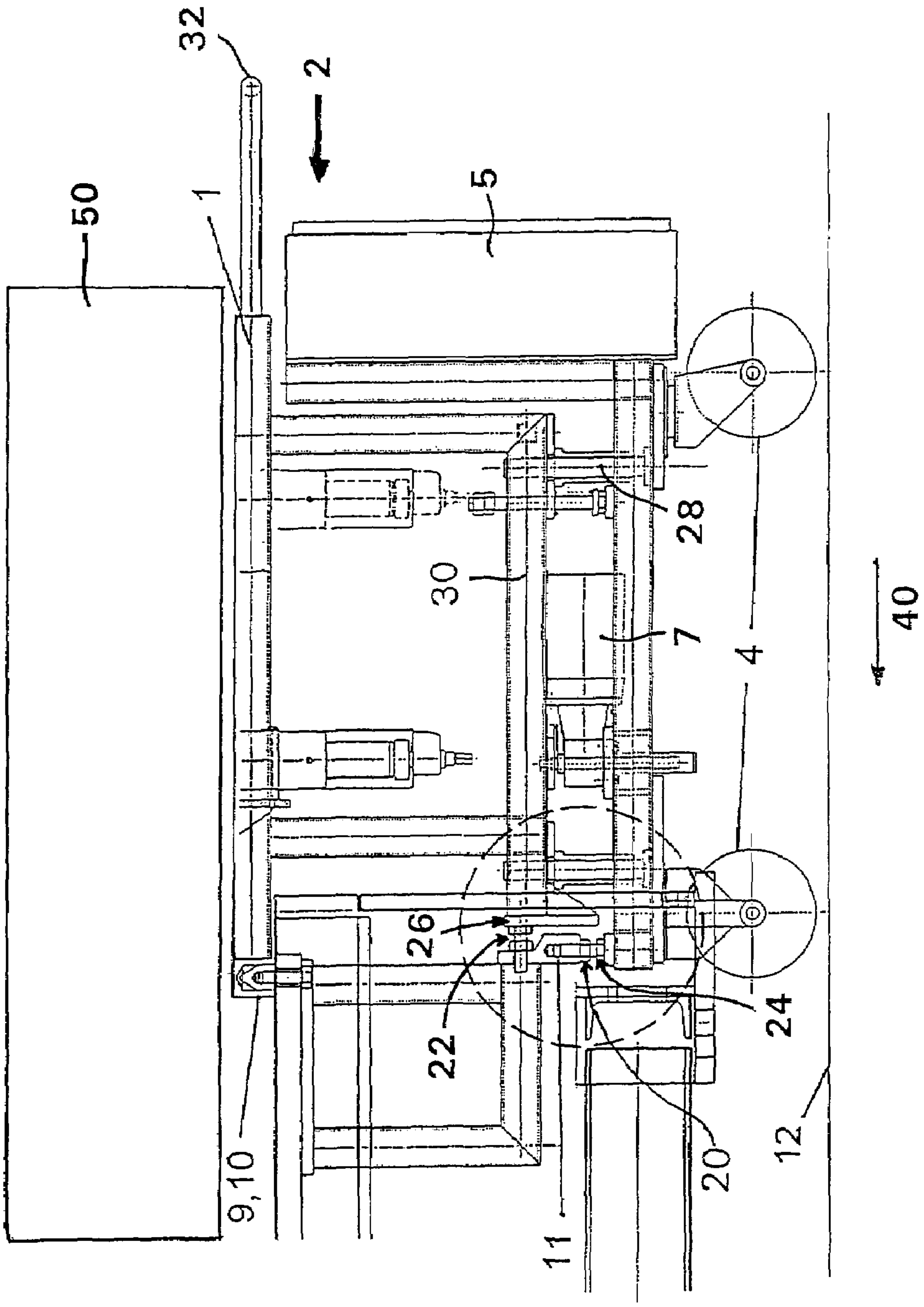
FIG. 7 is a side view of a module carrier according to a possible embodiment.

FIG. 2 shows a module carrier of the type claimed by the present application in the working position. FIG. 7 shows an alternate embodiment. Any number of aggregates or modules 50, such as, for example, labeling modules, inspection modules, or alignment models, may be used in conjunction with the transport device 2, or may be disposed atop the base support 1 in alternate embodiments. The transport device 2 may therefor be used to transport any number of different aggregates or modules from one place to another.

The figure shows clearly that the rollers 4 are no longer in contact with the floor of the building and that the unit is positioned and fixed in position exclusively by the active connection between the centering pin 9, the centering pin 10 and the stop elements 11.

In a further development, the aggregates that are located on the base support 1 include means that make possible a linear and/or rotational adjustment of their orientation in at least one of the three axes. As a result of this method, when the container being labeled is changed, for example, it is an easy matter to adjust the position of the label or the orientation of the label to the requirements of the new container.

Figure 8:
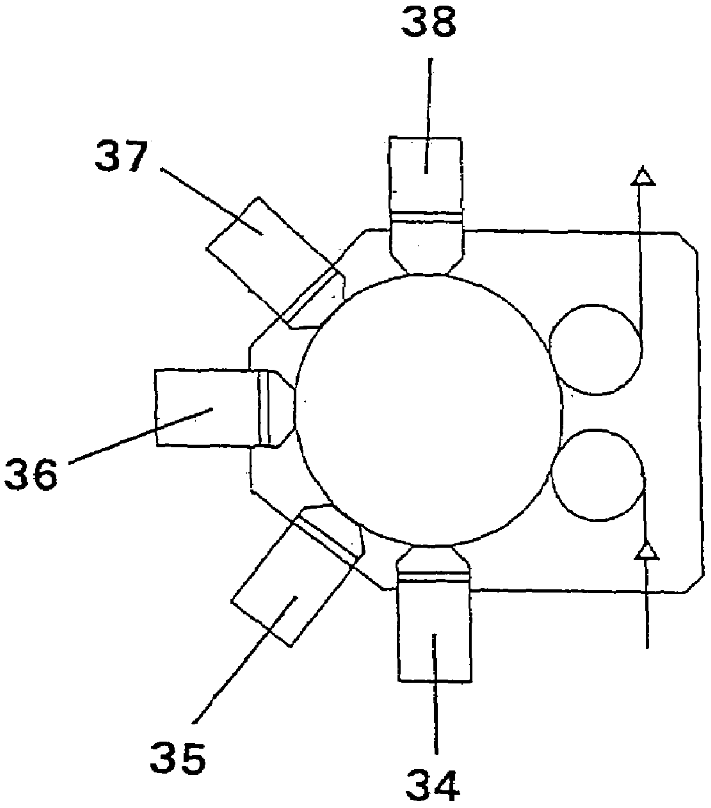
FIG. 8 shows in a simplified plan view a labeling machine or station in accordance with one possible embodiment.

There is shown in FIG. 8 in a simplified plan view of a labeling machine or station that comprises two alignment modules 34 and 35, a labeling module 36, a printing module 37, and an inspecting module 38. These modules may be examples of aggregates which may be above the base support 1 of the transport device 2.

So as to be able to adapt labeling machines more rapidly and with greater flexibility to changing labeling tasks, the present application suggests in one aspect that the necessary mechanical and/or electronic groups are combined in functional groups or modules that can be connected, by way of a standard interface at various positions of a labeling machine, by the transport device 2.

First an ‘alignment’ module is described.

For the case that the container is to be aligned prior to labeling, there is available that labeling machines are used that have support tables that are individually driven so as to rotate by its own servo-motor or stepping motor. This is often the case with modern labeling machines, because the provision of support tables that are driven by servo-motors or stepping motors, alone already for the realization of the rotational movements of containers per se that are necessary for the labeling of the containers, is highly advantageous.

When support tables are available that are driven for rotation by servo-motors or stepping motors, alignment of the containers can be realized in a simple and economical manner, because all the essential groups are already present.

For an alignment module, the module may comprise at least one camera and as a matter of contingency an arrangement to provide light. In a further, particularly advantageous embodiment, it is provided additionally to arrange, within a module, an evaluating computer that evaluates images produced by the at least one camera, that determines the necessary correction of the rotational position of the support table, and that transmits this correction, via the machine control of the labeling machine, to the support tables.

In a further embodiment, it is provided to transmit the necessary correction of the rotational position directly, that is, by bypassing the machine control, to the support tables. This operation considerably simplifies the program logic and the course of machine control and only a marginal expense is added. In order to realize this function, at least one sensor is associated with each support table. This sensor is disposed in the vicinity of the support table, that is, at the outer circumference of the turntable. At least one signal source is arranged within the alignment module. In the event that the alignment module now recognizes the requirement for a correction of the rotational position, the necessary information is directly passed, via the signal source and sensor, to the servo-motor or stepping motor, or, respectively, their control of the affected support table, such that this can perform the necessary rotational movements. The signal source and sensor may be, for example, a combination of an infrared transmitter and a receiver, such that by first impulses the direction of rotation and by following impulses the magnitude of the correction of rotational position that needs to be accomplished, is transmitted.

In this it is of particular advantage that the signal source extends along a certain portion of the arc prescribed by the sensor because in this manner compensation can be provided for the rotation of the turntable.

It is also provided to utilize two of more alignment modules. This arrangement can then be of particular advantage when an alignment of the containers is to be done particularly precisely and needs to be done in a rough alignment and also a fine alignment.

In particular applications use of mechanically, optically, capacitively, or inductively operating sensors or other sensors that operate under another method known in the state of the art, may be advantageous for the determination of the actual alignment of a container, with the sensor in such applications being a part of the exchangeable module.

Aside from the above-described ‘alignment’ module, utilization of an ‘inspecting’ module is contemplated in accordance with one aspect of the application.

The function of the ‘inspecting’ module comprises, for example, the checking of the labeling result. This can be an inspection that merely inquires whether a label is present, or it may comprise an expanded inquiry that additionally examines the proper position of the labels. For realization of this function there is also provided use of at least one camera and/or other sensors, with the operation of the sensors encompassing all methods known in the state of the art.

A particularly advantageous development of the inspecting module comprises that an evaluation computer is part of the module.

In a further development of the inspecting module there is provided that the data that are determined within the inspecting module, with respect to the position of the labels, can be utilized to correct the labeling. This includes, for example, automatic corrections of the rotational position of the support tables prior to or during the labeling per se, or also an automatic stop of the machine in the event that the labels on the containers are exceeding predetermined tolerance limits.

As well, embodiments of the inspecting module are contemplated that remove the incorrectly labeled container from further production processing.

Aside from utilization of the many solutions that have hitherto become known in the state of the art for the removal of the containers, that can also be used, it is contemplated to furnish the inspecting module per se with a removal arrangement. For example, this can be a vacuum-operated starwheel disposed on the inspecting module, that partially takes the responsibility of guiding bottles and accepts and removes defective containers.

In addition to the above-described modules, the present application may also propose a printing module as an aggregate on the base support. This printing module can comprise components that achieve all printing methods known in the art. Such printing methods can be, for example, laser printing/laser marking, ink jet, tampon printing or sieve printing. This printing module can be employed, for example, for lettering of containers with a date of minimum stability of shelf-life, or it can be employed in the direct printing on containers or labels.

With respect to the standard interface, in accordance with one aspect, the present application proposes that aside from a mechanical connection that affords a connection free of play and that ensures precise positioning of the module at the labeling machine also electrical interfaces are provided for the transfer of drive/operating energy and control signals. Designs of connections free of play and that ensure precise positioning, as well as interfaces for the transfer of drive/operating energy are generally known in the state of the art, so that at this point a detailed description can be waived.

For the transmission of control signals, inter alia, bus-systems are at hand by means of which, for example, all relevant information, such as, for example, actual position, set or required angle of rotation and actual angle of rotation, set or required rotational velocity and actual rotational velocity are transferred between the machine control, to the control computers arranged on the individual modules, and all participating machine components.

Figure 9:
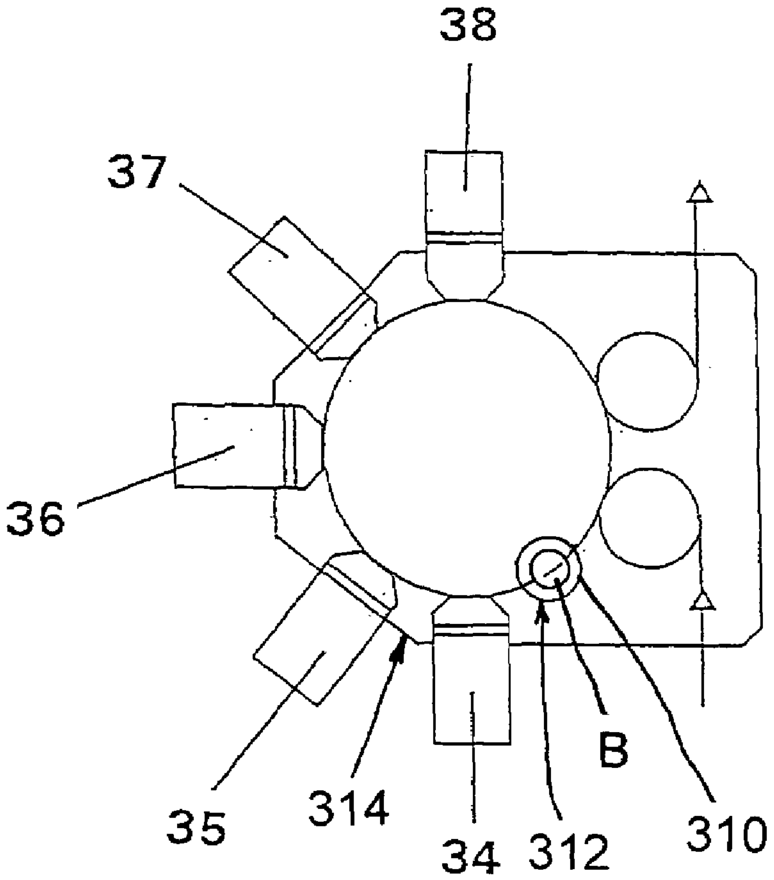
FIG. 9 shows a simplified plan view of a labeling station similar to FIG. 8 with additional detail in accordance with one possible embodiment.

Referring to FIG. 9, there is illustrated a labeling station with two alignment modules 34 and 35, a labeling module 36, a printing module 37, and an inspecting module 38. The modules are connectable to frame structure 314 of the labeling station. Containers, such as, for example, bottles B, are disposed on support tables 310 that each comprise an arrangement 312 configured to adjust the position of the corresponding support table 310, for example, to adjust to a desired rotational position the support table 310 and, accordingly, the bottle B supported thereon.

The prior art describes a number of solutions to positioning problems of the type described above, so that a further discussion of this topic is unnecessary in this application.

One feature or aspect of an embodiment is believed at the time of the filing of this patent application to possibly reside broadly in a beverage bottling plant for filling bottles with a liquid beverage filling material, said beverage bottling plant comprising: a filling machine being configured to fill empty bottles with liquid beverage filling material; a conveyer arrangement being configured and disposed to move empty bottles to said filling machine; said beverage filling machine comprising a plurality of beverage filling positions, each beverage filling position comprising a beverage filling device for filling bottles with liquid beverage filling material; said filling devices comprising an apparatus being configured to introduce a predetermined volume of liquid beverage filling material into the interior of bottles to a substantially predetermined level of liquid beverage filling material; said apparatus being configured to introduce a predetermined volume of liquid beverage filling material comprising an apparatus being configured to terminate the filling of beverage bottles upon liquid beverage filling material reaching said substantially predetermined level in bottles; a closing station being configured and disposed to close filled bottles; a conveyer arrangement being configured and disposed to transfer filled bottles from said filling machine to said closing station; a labeling station being configured and disposed to receive bottles to be labeled; a conveyer arrangement being configured and disposed to convey bottles to said labeling station; said labeling station comprising: a frame structure, said frame structure having an axis disposed vertically; a turntable structure being configured and disposed to rotate about said vertical axis of said frame structure, said turntable structure having a peripheral region; a drive arrangement being configured and disposed to rotate said turntable structure about said vertical axis of said frame structure; a plurality of support tables being configured to support and to rotate a bottle; said support tables being disposed at said peripheral region of said turntable structure; each support table having an axis disposed vertically about which vertical axis a support table can rotate; each support table comprising a drive arrangement being configured and disposed to rotate its corresponding support table about its vertical support table axis, to permit rotation of a bottle supported on a support table; a plurality of modules comprising: a first module being configured and disposed to monitor and adjust the rotational position of a bottle; a second module being configured and disposed to affix a label to a bottle; a third module being configured and disposed to print information on the label affixed to a bottle by said second, labeling, module; and a fourth module being configured and disposed to inspect for the presence of a label on a bottle, and to determine the position of a label on a bottle; said frame structure comprising a centering pin being disposed on an upper edge of said frame structure and being configured to align said modules with said frame structure; a plurality of module carriers, each being configured and disposed to support and permit transport of a corresponding one of said plurality of modules to permit installation and removal of a corresponding one of said plurality of modules; each of said module carriers comprising: a base support being configured and disposed to support a corresponding module thereon; said base support comprising a centering socket disposed substantially near the end of said base support; said centering socket being configured and disposed to be in engagement with said centering pin of said frame structure to align and hold a corresponding module with respect to said frame structure; a support bar structure on which said base support is mounted; a base frame on which said support bar structure is mounted; a lifting mechanism disposed between and to connect said base frame and said support bar structure; said lifting mechanism being configured and disposed to relatively move said base frame and support bar structure towards one another and away from one another to raise and lower a corresponding module; a set of guide rods being disposed between said support bar structure and said base frame, said guide rods being configured and disposed to guide said support bar structure upon movement of said support bar structure by said lifting mechanism; a cabinet for holding electric devices or motors for the operation of said module carrier; and a set of wheels or rollers disposed on the bottom of said base frame to permit movement of said module carrier; said frame structure comprising a first stop element; said support bar structure comprising a first end face; said first end face being configured and disposed to contact said first stop element to stop movement of its module carrier upon movement of said module carrier to install a corresponding one of said plurality of modules to align said module with said frame structure; said frame structure comprising a second stop element; said base frame comprising a second end face; said second end face being configured and disposed to contact said second stop element to stop movement of said base frame upon movement of said base frame by said lifting mechanism; and said lifting device being configured to be activated upon alignment of its module carrier with said frame structure to lower said support bar structure and said base support to permit engagement of said centering socket and said centering pin, and to raise said base frame to permit engagement of said second end face and said second stop element, to thus clamp and hold its module carrier to said frame structure.

One feature or aspect of an embodiment is believed at the time of the filing of this patent application to possibly reside broadly in a module carrier for supporting and carrying modules of a beverage bottle labeling machines and similar installations in a beverage bottling plant, said module carrier comprising: a base support being configured and disposed to support a corresponding labeling machine module thereon; a support bar structure on which said base support is mounted; a base frame on which said support bar structure is mounted; a lifting mechanism disposed between and to connect said base frame and said support bar structure; said lifting mechanism being configured and disposed to relatively move said base frame and support bar structure towards one another and away from one another to raise and lower a corresponding labeling machine module; a set of wheels or rollers disposed on the bottom of said base frame to permit movement of said module carrier; and said lifting device being configured to be activated upon alignment of said module carrier with a frame structure of a labeling machine to lower said support bar structure and said base support and to raise said base frame, to thus clamp and hold said module carrier to a frame structure of a labeling machine.

One feature or aspect of an embodiment is believed at the time of the filing of this patent application to possibly reside broadly in a module carrier for use on bottle handling machines such as labeling machines and similar installations, which is designed in a modular construction, characterized by the fact that the module carrier and/or the modules are held in a first "ready" position by the module carrier and in a second centered and/or working position can be attached to a bottle handling machine.

Another feature or aspect of an embodiment is believed at the time of the filing of this patent application to possibly reside broadly in a module carrier characterized by the fact that the module carrier, after it has been docked, can be moved out of its carried and supported position, and at the beginning of the undocking process can be returned to the carried and supported position.

Yet another feature or aspect of an embodiment is believed at the time of the filing of this patent application to possibly reside broadly in a module carrier characterized by the fact that the module carrier and/or the module is centered in at least a first level on the bottle handling machine and is centered on a second level by gravity.

Still another feature or aspect of an embodiment is believed at the time of the filing of this patent application to possibly reside broadly in a module carrier characterized by the fact that the module carrier and/or the module is centered in a first upper level and/or plane, and in a second, lower level is automatically centered by gravity and/or by a freely adjustable stop.

A further feature or aspect of an embodiment is believed at the time of the filing of this patent application to possibly reside broadly in a module carrier for use on labeling machines that are realized in a modular construction, characterized by the fact that the module carrier is equipped with means that facilitate its mobility.

Another feature or aspect of an embodiment is believed at the time of the filing of this patent application to possibly reside broadly in a device characterized by the fact that said means are rollers or wheels.

Yet another feature or aspect of an embodiment is believed at the time of the filing of this patent application to possibly reside broadly in a device characterized by the fact that the module carrier contains a lifting device for the module, and for itself after the module is docked.

Still another feature or aspect of an embodiment is believed at the time of the filing of this patent application to possibly reside broadly in a device characterized by the fact that the lifting device is at least one spindle hoisting mechanism or at least one scissor-jack mechanism or a hydraulic system.

A further feature or aspect of an embodiment is believed at the time of the filing of this patent application to possibly reside broadly in a device characterized by the fact that the module carrier is equipped with an energy storage device.

Another feature or aspect of an embodiment is believed at the time of the filing of this patent application to possibly reside broadly in a device characterized by the fact that the energy storage device is at least one storage battery for electrical energy.

Yet another feature or aspect of an embodiment is believed at the time of the filing of this patent application to possibly reside broadly in a device characterized by the fact that the rollers are driven by at least one motor.

Still another feature or aspect of an embodiment is believed at the time of the filing of this patent application to possibly reside broadly in a device characterized by the fact that when the module carrier is engaged, it can be raised from the building floor at least party by its own lifting device.

Another feature or aspect of an embodiment is believed at the time of the filing of this patent application to possibly reside broadly in a device characterized by the fact that when the module carrier and/or the module are engaged, it or they can be lifted completely off the building floor.

A further feature or aspect of an embodiment is believed at the time of the filing of this patent application to possibly reside broadly in a device characterized by the fact that the module carrier and/or the module have at least one centering bushing or a similar device.

Yet another feature or aspect of an embodiment is believed at the time of the filing of this patent application to possibly reside broadly in a device characterized by the fact that the aggregates located on the base support contain means for the linear and/or rotational adjustment of their orientation in at least one of the three axes.

Some examples of bottling systems that may possibly be utilized or possibly adapted for use in at least one possible embodiment of the present application may possibly be found in the following U.S. patents, all assigned to the Assignee herein, namely: U.S. Pat. No. 4,911,285; U.S. Pat. No. 4,944,830; U.S. Pat. No. 4,950,350; U.S. Pat. No. 4,976,803; U.S. Pat. No. 4,981,547; U.S. Pat. No. 5,004,518; U.S. Pat. No. 5,017,261; U.S. Pat. No. 5,062,917; U.S. Pat. No. 5,062,918; U.S. Pat. No. 5,075,123; U.S. Pat. No. 5,078,826; U.S. Pat. No. 5,087,317; U.S. Pat. No. 5,110,402; U.S. Pat. No. 5,129,984; U.S. Pat. No. 5,167,755; U.S. Pat. No. 5,174,851; U.S. Pat. No. 5,185,053; U.S. Pat. No. 5,217,538; U.S. Pat. No. 5,227,005; U.S. Pat. No. 5,413,153; U.S. Pat. No. 5,558,138; U.S. Pat. No. 5,634,500; U.S. Pat. No. 5,713,403; U.S. Pat. No. 6,276,113; U.S. Pat. No. 6,213,169; U.S. Pat. No. 6,189,578; U.S. Pat. No. 6,192,946; U.S. Pat. No. 6,374,575; U.S. Pat. No. 6,365,054; U.S. Pat. No. 6,619,016; U.S. Pat. No. 6,474,368; U.S. Pat. No. 6,494,238; U.S. Pat. No. 6,470,922; and U.S. Pat. No. 6,463,964.

The components disclosed in the various publications, disclosed or incorporated by reference herein, may possibly be used in possible embodiments, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of stepping motors that may possibly be utilized or possibly adapted for use in at least one possible embodiment of the present application may possibly be found in the following U.S. patents: U.S. Pat. No. 6,348,774 issued to Andersen et al. on Feb. 19, 2002; U.S. Pat. No. 6,373,209 issued to Gerber et al. on Apr. 16, 2002; U.S. Pat. No. 6,424,061 issued to Fukuda et al. on Jul. 23, 2002; U.S. Pat. No. 6,509,663 issued to Aoun on Jan. 21, 2003; U.S. Pat. No. 6,548,923 to Ohnishi et al. on Apr. 15, 2003; and U.S. Pat. No. 6,661,193 issued to Tsai on Dec. 9, 2003.

The appended drawings in their entirety, including all dimensions, proportions and/or shapes in at least one embodiment of the present application, are accurate and are hereby included by reference into this specification.

Some examples of laser marking that may possibly be utilized or possibly adapted for use in at least one possible embodiment of the present application may possibly be found in the following U.S. patents: U.S. Pat. No. 6,429,889 issued to Murokh on Aug. 6, 2002; U.S. Pat. No. 6,483,073 issued to Tenderly on Nov. 19, 2002; U.S. Pat. No. 6,489,985 issued to Brodsky et al. on Dec. 3, 2002; U.S. Pat. No. 6,613,161 issued to Zheng et al. on Sep. 2, 2003; U.S. Pat. No. 6,627,299 issued to Feng et al. on Sep. 30, 2003; and U.S. Pat. No. 6,683,637 issued to Corbett on Jan. 27, 2004.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of laser printing arrangements that may possibly be utilized or possibly adapted for use in at least one possible embodiment of the present application may possibly be found in the following U.S. patents: U.S. Pat. No. 4,847,643 issued to Ohmori on Jul. 11, 1989; U.S. Pat. No. 5,294,945 issued to Omura et al. on Mar. 15, 1994; U.S. Pat. No. 5,528,280 issued to Endo et al. on Jun. 18, 1996; U.S. Pat. No. 6,210,778 issued to Poirier et al. on Apr. 3, 2001; U.S. Pat. No. 6,433,810 issued to Katayama et al. on Aug. 13, 2002; and U.S. Pat. No. 6,655,275 issued to Mugrauer on Dec. 2, 2003.

All, or substantially all, of the components and methods of the various embodiments may be used with at least one embodiment or all of the embodiments, if more than one embodiment is described herein.

Some examples of ink jet printing apparatus and methods that may possibly be utilized or possibly adapted for use in at least one possible embodiment of the present application may possibly be found in the following U.S. patents: U.S. Pat. No. 6,582,047 issued to Koitabashi et al. on Jun. 24, 2003; U.S. Pat. No. 6,623,093 issued to Takahashi et al. on Sep. 23, 2003; U.S. Pat. No. 6,625,351 issued to Cox et al. on Sep. 23, 2003; U.S. Pat. No. 6,652,055 issued to Oikawa on Nov. 25, 2003; U.S. Pat. No. 6,669,767 issued to Blease et al. on Dec. 30, 2003; and U.S. Pat. No. 6,688,739 issued to Murray on Feb. 10, 2004.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Some examples of screen printing apparatus that may possibly be utilized or possibly adapted for use in at least one possible embodiment of the present application may possibly be found in the following U.S. patents: U.S. Pat. No. 5,374,449 issued to Bühlmann et al. on Dec. 20, 1994; U.S. Pat. No. 5,722,321 issued to Szyszko et al. on Mar. 3, 1998; U.S. Pat. No. 6,591,745 issued to Miyahara et al. on Jul. 15, 2003; U.S. Pat. No. 6,601,502 issued to Kamen et al. on Aug. 5, 2003; U.S. Pat. No. 6,619,197 issued to Murakami et al. on Sep. 16, 2003; and U.S. Pat. No. 6,659,005 issued to Takahashi et al. on Dec. 9, 2003.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Some examples of servo-motors that may possibly be utilized or possibly adapted for use in at least one possible embodiment of the present application may possibly be found in the following U.S. patents: U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025 issued to Yasui on Feb. 15, 2000.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The corresponding foreign patent publication applications, namely, Federal Republic of Germany Patent Application No. 103 29 670, filed on Jul. 2, 2003, having inventors Siegmar Sindermann, Paul Kahlisch, and Klaus Friedrich Stock, and DE-OS 103 29 670 and DE-PS 103 29 670, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Some examples of labeling machines which may possibly be utilized in at least one possible embodiment may possibly be found in the following U.S. patents: U.S. Pat. No. 6,634,400, entitled "Labeling machine;" U.S. Pat. No. 6,561,246, entitled "Labeling machine capable of precise attachment of a label to different sizes of containers;" U.S. Pat. No. 6,550,512, entitled "Labeling machine capable of preventing erroneous attachment of labels on containers;" U.S. Pat. No. 6,543,514, entitled "In-line continuous feed sleeve labeling machine and method;" U.S. Pat. No. 6,378,587, entitled "Cylindrical container labeling machine;" U.S. Pat. No. 6,328,086, entitled "Labeling machine;" U.S. Pat. No. 6,315,021, entitled "Labeling machine;" U.S. Pat. No. 6,263,940, entitled "In-line continuous feed sleeve labeling machine and method;" U.S. Pat. No. 6,199,614, entitled "High speed labeling machine having a constant tension driving system;" U.S. Pat. No. 6,167,935, entitled "Labeling machine; U.S. Pat. No. 6,066,223, entitled "Labeling machine and method; U.S. Pat. No. 6,050,319, entitled "Non-round container labeling machine and method;" and U.S. Pat. No. 6,045,616, entitled "Adhesive station and labeling machine."

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

Some examples of tampon printing apparatus that may possibly be utilized or possibly adapted for use in at least one possible embodiment of the present application may possibly be found in the following U.S. patents: U.S. Pat. No. 4,723,485 issued to Berberich et al. on Feb. 9, 1988; U.S. Pat. No. 5,003,872 issued to Dalferth on Apr. 2, 1991; U.S. Pat. No. 5,383,398 issued to Binned on Jan. 24, 1995; U.S. Pat. No. 5,222,433 issued to Philipp on Jun. 29, 1993; U.S. Pat. No. 5,802,972 issued to Hoffmann et al. on Sep. 8, 1998; and U.S. Pat. No. 6,619,203 issued to Philipp on Sep. 16, 2003.

The embodiments described herein above in the context of the preferred embodiments are not to be taken as limiting the embodiments to all of the provided details thereof, since modifications and variations thereof may be made without departing from the spirit and scope of the embodiments.

What is claimed is:

1. A beverage bottle labeling arrangement configured to label beverage bottles in a beverage bottling plant, said beverage bottle labeling arrangement comprising:

a labeling machine being configured to label bottles;

an input arrangement being configured to transfer bottles to be labeled into said labeling machine;

an output arrangement being configured to transfer labeled bottles out of said labeling machine; and said labeling machine comprising:

a base support structure comprising a coupling structure;

a rotor structure being mounted on said base support structure and being configured to be rotated about a vertical axis by a drive arrangement;

a plurality of support tables, each being mounted on the periphery of said rotor structure and being configured to be rotated about a vertical axis by a drive arrangement;

each of said support tables being configured to support and rotate a bottle disposed thereon;

a first interchangeable labeling machine module being configured to affix a first type of label to bottles;

a second interchangeable labeling machine module being configured to one of (a), (b), (c), and (d):

(a) affix a second type of label to bottles;

(b) monitor and adjust the rotational position of a bottle;

(c) print information on a label affixed to a bottle; and (d) inspect for the presence of a label on a bottle and determine the position of a label on a bottle;

a first module carrier being configured to support said first labeling machine module mounted thereon;

said first module carrier being movable to permit installation of said first labeling machine module in said labeling machine, and to permit removal of said first labeling machine module from said labeling machine;

a second module carrier being configured to support said second labeling machine module mounted thereon;

said second module carrier being movable to permit installation of said second labeling machine module in said labeling machine, and to permit removal of said second labeling machine module from said labeling machine; and each of said first and second module carriers comprising:

a first frame structure being configured and disposed to support a labeling machine module thereon;

said first frame structure comprising a centering bushing configured to be coupled with said coupling structure;

a second frame structure being configured and disposed to support said first frame structure;

at least one set of rollers or wheels being disposed on the bottom of said second frame structure to permit movement of a module carrier to said labeling machine and away from said labeling machine;

a drive mechanism disposed between and to connect said first and second frame structures;

said drive mechanism being configured and disposed to relatively move said first and second frame structures towards one another to lower a labeling machine module from a disengaged position into an engaged, operating position in said labeling machine, and to clamp its module carrier onto said coupling structure of said base support structure of said labeling machine to essentially prevent movement of its module carrier; and said drive mechanism being configured and disposed to relatively move said first and second frame structures away from one another to raise a labeling machine module out of said engaged, operating position and back into said disengaged position, and to unclamp its module carrier from said coupling structure of said base support structure of said labeling machine to permit movement of its module carrier.

2. The beverage bottle labeling arrangement according to claim 1, wherein:

each of said module carriers is configured to be moved out of a first position where solely said module carrier is carrying and supporting a labeling machine module disposed thereon and into a second position where said labeling machine module is at least partly supported by said base support structure, upon each of said module carriers being attached to said base support structure;

each of said module carriers is configured to be moved back into said first position from said second position upon beginning of being detached from said base support structure;

an upper portion of each of said module carriers is configured to be centered by said base support structure;

a lower portion of each of said module carriers is configured to be centered by gravity;

said upper portion of each of said module carriers is configured to be centered in a first upper level and/or plane; and said lower portion of each of said module carriers is configured to be automatically centered by gravity and/or by a freely adjustable stop in a second lower level and/or plane.

3. The beverage bottle labeling arrangement according to claim 2, wherein:

said drive mechanism comprises at least one spindle hoisting mechanism or at least one scissor-jack mechanism or a hydraulic system;

each of said module carriers is equipped with an energy storage device comprising at least one storage battery for electrical energy;

said rollers or wheels are driven by at least one motor;

each of said module carriers is configured to be raised completely off a building floor by said drive mechanism upon said labeling machine module being in said engaged position; and said modules comprise adjustment mechanisms for the linear and/or rotational adjustment of their orientation in at least one of the three axes.

4. A beverage bottle labeling arrangement configured to label beverage bottles in a beverage bottling plant, said beverage bottle labeling arrangement comprising:

a labeling machine being configured to label bottles;

an input arrangement being configured to transfer bottles to be labeled into said labeling machine;

an output arrangement being configured to transfer labeled bottles out of said labeling machine; and said labeling machine comprising:

a base support structure comprising a coupling structure;

a rotor structure being mounted on said base support structure and being configured to be rotated about a vertical axis by a drive arrangement;

a plurality of support tables, each being mounted on the periphery of said rotor structure and being configured to be rotated about a vertical axis by a drive arrangement;

each of said support tables being configured to support and rotate a bottle disposed thereon;

a first interchangeable labeling machine module;

a second interchangeable labeling machine module;

a first module carrier being configured to support said first labeling machine module mounted thereon;

said first module carrier being movable to permit installation of said first labeling machine module in said labeling machine, and to permit removal of said first labeling machine module from said labeling machine;

a second module carrier being configured to support said second labeling machine module mounted thereon;

said second module carrier being movable to permit installation of said second labeling machine module in said labeling machine, and to permit removal of said second labeling machine module from said labeling machine;

each of said first and second module carriers comprising:

a frame structure being configured and disposed to support a labeling machine module thereon;

at least one set of rollers or wheels being disposed on the bottom of said frame structure to permit movement of a module carrier to said labeling machine and away from said labeling machine;

said frame structure being configured to permit movement of a labeling machine module from a disengaged position to an engaged, operating position in said labeling machine;

said frame structure being configured to permit movement of a labeling machine module from said engaged, operating position and back into said disengaged position;

said frame structure comprising a centering bushing being configured to be coupled with said coupling structure of said base support structure upon movement of a labeling machine module into said engaged, operating position from said disengaged position; and said frame structure being configured to be uncoupled from said coupling structure of said base support structure upon movement of a labeling machine module into said disengaged position from said engaged, operating position;

each of said module carriers is configured to be moved out of a first position where solely said module carrier is carrying and supporting a labeling machine module disposed thereon and into a second position where said labeling machine module is at least partly supported by said base support structure, upon each of said module carriers being attached to said base support structure;

each of said module carriers is configured to be moved back into said first position from said second position upon beginning of being detached from said base support structure;

an upper portion of each of said module carriers is configured to be centered by said base support structure;

a lower portion of each of said module carriers is configured to be centered by gravity;

said upper portion of each of said module carriers is configured to be centered in a first upper level and/or plane; and said lower portion of each of said module carriers is configured to be automatically centered by gravity and/or by a freely adjustable stop in a second lower level and/or plane.

5. The beverage bottle labeling arrangement according to claim 4, wherein:

said frame structure comprises:

a first frame structure being configured and disposed to support a labeling machine module thereon; and a second frame structure being configured and disposed to support said first frame structure;

each of said module carriers comprises a drive mechanism disposed between and to connect said first and second frame structures;

said drive mechanism is configured and disposed to relatively move said first and second frame structures towards one another to lower a labeling machine module from a disengaged position into an engaged, operating position in said labeling machine, and to clamp its module carrier onto said base support structure of said labeling machine to essentially prevent movement of its module carrier;

said drive mechanism is configured and disposed to relatively move said first and second frame structures away from one another to raise a labeling machine module out of said engaged, operating position and back into said disengaged position, and to unclamp its module carrier from said base support structure of said labeling machine to permit movement of its module carrier;

said drive mechanism comprises at least one spindle hoisting mechanism or at least one scissor-jack mechanism or a hydraulic system;

each of said module carriers is equipped with an energy storage device comprising at least one storage battery for electrical energy;

said rollers or wheels are driven by at least one motor;

each of said module carriers is configured to be raised completely off a building floor by said drive mechanism upon said labeling machine module being in said engaged position;

said modules comprise adjustment mechanisms for the linear and/or rotational adjustment of their orientation in at least one of the three axes;

said first interchangeable labeling machine module is configured to affix a first type of label to bottles; and said second interchangeable labeling machine module is configured to one of (a), (b), (c), and (d):

(a) affix a second type of label to bottles;

(b) monitor and adjust the rotational position of a bottle;

(c) print information on a label affixed to a bottle; and (d) inspect for the presence of a label on a bottle and determine the position of a label on a bottle.

6. A beverage bottle labeling arrangement configured to label beverage bottles in a beverage bottling plant, said beverage bottle labeling arrangement comprising:

a labeling machine being configured to label bottles;

an input arrangement being configured to transfer bottles to be labeled into said labeling machine;

an output arrangement being configured to transfer labeled bottles out of said labeling machine; and said labeling machine comprising:

a base support structure;

a rotor structure being mounted on said base support structure and being configured to be rotated about a vertical axis by a drive arrangement;

a plurality of support tables, each being mounted on the periphery of said rotor structure and being configured to be rotated about a vertical axis by a drive arrangement;

each of said support tables being configured to support and rotate a bottle disposed thereon;

a first interchangeable labeling machine module;

a second interchangeable labeling machine module;

a first module carrier being configured to support said first labeling machine module mounted thereon;

said first module carrier being movable to permit installation of said first labeling machine module in said labeling machine, and to permit removal of said first labeling machine module from said labeling machine;

a second module carrier being configured to support said second labeling machine module mounted thereon;

said second module carrier being movable to permit installation of said second labeling machine module in said labeling machine, and to permit removal of said second labeling machine module from said labeling machine; and each of said first and second module carriers comprising:

a frame structure being configured and disposed to support a labeling machine module thereon;

at least one set of rollers or wheels being disposed on the bottom of said frame structure to permit movement of a module carrier to said labeling machine and away from said labeling machine;

said frame structure being configured to permit movement of a labeling machine module from a disengaged position to an engaged, operating position in said labeling machine;

said frame structure being configured to permit movement of a labeling machine module from said engaged, operating position and back into said disengaged position;

said frame structure being configured to be attached to said base support structure upon movement of a labeling machine module into said engaged, operating position from said disengaged position;

said frame structure being configured to be detached from said base support structure upon movement of a labeling machine module into said disengaged position from said engaged, operating position; and said at least one set of rollers or wheels being configured to be raised from a position on a building floor to a position completely off of a building floor upon said labeling machine module being moved from said disengaged position into said engaged, operating position.

7. The beverage bottle labeling arrangement according to claim 6, wherein:

each of said module carriers is configured to be moved out of a first position where solely said module carrier is carrying and supporting a labeling machine module disposed thereon and into a second position where said labeling machine module is at least partly supported by said base support structure, upon each of said module carriers being attached to said base support structure; and each of said module carriers is configured to be moved back into said first position from said second position upon beginning of being detached from said base support structure.

8. The beverage bottle labeling arrangement according to claim 7, wherein:

an upper portion of each of said module carriers is configured to be centered by said base support structure; and a lower portion of each of said module carriers is configured to be centered by gravity.

9. The beverage bottle labeling arrangement according to claim 8, wherein:

said upper portion of each of said module carriers is configured to be centered in a first upper level and/or plane; and said lower portion of each of said module carriers is configured to be automatically centered by gravity and/or by a freely adjustable stop in a second lower level and/or plane.

10. The beverage bottle labeling arrangement according to claim 9, wherein:

said frame structure comprises:

a first frame structure being configured and disposed to support a labeling machine module thereon; and a second frame structure being configured and disposed to support said first frame structure;

each of said module carriers comprises a drive mechanism disposed between and to connect said first and second frame structures;

said drive mechanism is configured and disposed to relatively move said first and second frame structures towards one another to lower a labeling machine module from a disengaged position into an engaged, operating position in said labeling machine, and to clamp its module carrier onto said base support structure of said labeling machine to essentially prevent movement of its module carrier; and said drive mechanism is configured and disposed to relatively move said first and second frame structures away from one another to raise a labeling machine module out of said engaged, operating position and back into said disengaged position, and to unclamp its module carrier from said base support structure of said labeling machine to permit movement of its module carrier.

11. The beverage bottle labeling arrangement according to claim 10, wherein said drive mechanism comprises at least one spindle hoisting mechanism or at least one scissor-jack mechanism or a hydraulic system.

12. The beverage bottle labeling arrangement according to claim 11, wherein each of said module carriers is equipped with an energy storage device comprising at least one storage battery for electrical energy.

13. The beverage bottle labeling arrangement according to claim 12, wherein said rollers or wheels are driven by at least one motor.

14. The beverage bottle labeling arrangement according to claim 13, wherein each of said module carriers is configured to be raised completely off a building floor by said drive mechanism upon said labeling machine module being in said engaged position.

15. The beverage bottle labeling arrangement according to claim 14, wherein:

said base structure comprises a coupling structure; and at least one of said module carriers and/or said labeling machine modules comprises at least one centering bushing configured to couple with said coupling structure.

16. The beverage bottle labeling arrangement according to claim 15, wherein said modules comprise adjustment mechanisms for the linear and/or rotational adjustment of their orientation in at least one of the three axes.

17. The beverage bottle labeling arrangement according to claim 16, wherein:

said first interchangeable labeling machine module is configured to affix a first type of label to bottles; and said second interchangeable labeling machine module is configured to one of (a), (b), (c), and (d):

(a) affix a second type of label to bottles;

(b) monitor and adjust the rotational position of a bottle;

(c) print information on a label affixed to a bottle; and (d) inspect for the presence of a label on a bottle and determine the position of a label on a bottle.

* * * * *